3,042,636
Patented July 3, 1962

3,042,636
BORACYCLOOCTANE CONDENSATION POLYMERS
Bernard Rudner and Mead S. Moores, Pittsburgh, Pa., assignors to Koppers Company, Inc., a corporation of Delaware
No Drawing. Filed Dec. 17, 1959, Ser. No. 860,064
11 Claims. (Cl. 260—9)

This invention relates to novel condensation polymers containing, as a portion of their structure, bicyclic boron-oxygen-nitrogen heterocycles. In one specific aspect, it relates to condensation products of polyols and alkylene bis-aza-boradioxacyclooctanes.

In our copending application, S.N. 860,071, filed even date herewith, we have disclosed and claimed a new class of basic boron-oxygen-nitrogen heterocycles which are useful intermediates in the direct preparation of new hydrolytically-stable condensation polymers. We have found that a class of such polymers, having remarkable utility as textile modifiers, thickeners for paints and latices, components of rug backing materials, fillers and surface modifiers, can be made by condensing a polyhydric alcohol with the alkylene-bis-aza-boracyclooctanes disclosed and claimed in our copending application.

It is, therefore, an object of the present invention to provide new hydrolytically-stable condensation polymers which, because of their physical and chemical properties, are useful generally as textile modifiers, and in paints and i other coating applications as thickeners, fillers and fire-retardants.

In accordance with the invention, we have discovered novel polymeric condensation products of an alkylene-bis-aza-boradioxacyclooctane of the general formula:

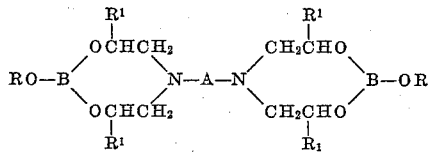

wherein R is a member selected from the group consisting of hydrogen, lower alkyl and furfuryl, R' is hydrogen or lower alkyl, and A is a bifunctional lower alkylene residue, containing from 2 to 6 carbon atoms, which is attached to each nitrogen atom through a different carbon atom; with a polyhydric alcohol selected from the group consisting of (a) saturated aliphatic polyols having from 2 to 6 carbon atoms and from 2 to 4 hydroxyl groups, each on separate carbon atoms, (b) hydroxy(polyalkoxy)-alkanols of the formula $HO(C_nH_{2n}O)_mH$, in which $n$ is an integer having a value of 2 to 4 and $m$ is an integer having a value of 1 to 5, (c) bisphenols, and (d) cellulose compounds.

The new polymers are made by reacting an alkylene-bis-aza-boradioxacyclooctane with a polyhydric alcohol of the above-indicated classes at an elevated temperature, preferably in the presence of a solvent. The reaction is continued until complete; the alcohol or water formed during the condensation preferably being driven off during the process. A polymeric product, usually in solid form, is thereafter recovered from the reaction mixture, most conveniently by filtration.

The useful alkylene-bis-aza-boradioxacyclooctanes are those having the general formula given hereabove. A detailed procedure for making these compounds is given in our copending application, S.N. 860,071. Generally speaking, they are prepared by the reaction of a N,N,-N',N' - tetrakis(2 - hydroxyalkyl)alkylenediamine with boric acid, boric oxide, or a trialkylborate. The particular compound obtained and the specific reaction conditions employed vary with the choice of reactant. The above reactions may be conducted with or without solvent, but the use of an inert solvent, e.g. chloroform or toluene, is desirable. For ease of operation it is preferred to use atmospheric pressure and a temperature ranging between about 50 and 150° C. Because of the basicity of the parent alkylenediamines, their reaction with boric acid and with trialkylborates is self-catalyzed. When boric oxide is used, it is desirable to use a small amount (e.g. 1–5%) of a strong mineral acid such as sulfuric or hydrochloric acid or a strong organic acid such as p-toluenesulfonic acid. The use of an alkali metal borate with a slightly greater than stoichiometric quantity of acid gives, in practice, the same results as use of preformed boric acid. Certain of the products are interconvertible by hydrolysis, esterification, or transesterification.

Alcohols suitable for purposes of the invention include aliphatic diols having from 2 to 6 carbon atoms such as ethanediol, 1,2-propanediol, 1,2-butanediol, 1,4-butanediol, 1,6-hexanediol, and the like; poly(hydroxy-methyl)-alkanes having less than 6 carbon atoms and from 2 to 4 hydroxyl-containing substituents such as pentaerythritol, glycerine, trimethylolethane, neopentyl glycol, and the like; hydroxy(polyalkoxy)alkanols of the formula $$HO(C_nH_{2n}O)_mH$$

($n$ equals 2–4, $m$ equals 1–5), which are commercially available, as, e.g. "polyethylene glycols"; bisphenols such as 2,2-bis-(4-hydroxyphenyl)-propane (Bisphenol A), 4,4'-dihydroxy benzophenone, 1,1-bis-4-hydroxyphenyl) ethane, 1,1-bis-(4-hydroxyphenyl)isobutane, 2,2-bis-(4-hydroxyphenyl)butane, 2,2-bis-(4-hydroxy-2-methylphenyl)-propane, dihydroxydiphenyl sulfone, 2,2-bis-(4-hydroxy-2-tertiary butyl phenyl)propane, bis-(2-dihydroxynaphthyl)methane, 1,5-dihydroxynaphthalene; and polysaccharides and other cellulosic compounds such as glucose, amylose, alpha and beta cellulose, rayon, cellulose acetate, cellulose acetobutyrate, and the like.

To facilitate product recovery and to promote contact between the reactants, the reaction is suitably conducted in an inert organic solvent. Useful solvents include hydrocarbons, e.g. heptane, cyclohexane, benzene, xylene, and the like; ethers, e.g. diethyl ether, diamyl ether, dioxane and anisole; amides, e.g. dimethylformamide and dimethylacetamide; halohydrocarbons, e.g. chloroform, carbontetrachloride, trichloroethylene and chlorobenzene; nitroaromatics, e.g. nitrobenzene. For purposes of the invention, it is desirable that the solvent used is less volatile than the ROH formed during reaction, and frequently preferable that it is capable of forming a solvent-poor azeotrope with ROH.

Since the reaction involved is a simple condensation, it is desirable to use substantially stoichiometric quantities of the reactants. If an excess of either reactant is used, the polymer end groups are, of course, changed; a large excess of either reactant makes necessary extra purification and recovery steps.

The reaction is conducted at a temperature above the boiling point of the water or lower alcohol formed as a co-product in order to promote condensation and drive the reaction to completion. Alternatively, if an azeotrope-forming solvent is used, the reaction temperature should be higher than that of the solvent-co-product azeotrope. The limiting upper temperature for the reaction is, of course, the temperature of thermal decomposition of the product polymer. It is preferable, for this reason, to use a solvent boiling below that temperature. Thus, suitable reaction temperatures generally range from between about 60° C. and 210° C. Since polymerization is more rapid at higher temperatures, e.g. 100° and above, the use of such temperatures is preferred. The reflux temperature of a suitable solvent is conveniently used to permit ready removal of the co-product water or lower alcohol.

The reaction is preferably conducted at atmospheric pressure to facilitate co-product removal. In certain cases, use of other pressures may be helpful, for example where it is possible to form an azeotrope richer in the co-product to be removed without decreasing the rate of condensation. The use of reduced pressures is desirable when a lower reaction temperature is required or, in the absence of solvent, to dry the molten reaction mass molten at higher temperatures.

Completion of the reaction is conveniently determined by the cessation of water or alcohol evolution; this is often easily determined by heating the reaction mixture until a constant weight is obtained. The reaction time depends to some extent on the nature of the starting materials, but, generally speaking, a heating period of one to 24 hours is sufficient.

The attainment of constant involatile weight at a relatively high temperature means that the polymer has been formed quantitatively, and that, in general, it has a high molecular weight. It is frequently desirable, however, to prepare a relatively low molecular weight polymer, e. g.

slurry. Condensation of vapors in the cooled upper portion of the tube indicated that transesterification had started even below the boiling point of the co-product, butyl alcohol. The tube was held at 125° for 15 minutes, then 150° for 10 minutes. Further distillation occurred, and a portion of the reaction mixture appeared to melt at about 145° C. The mixture was kept at 200° C. for 10 minutes, then evacuated (at 0.1 mm. of mercury) at the same temperature for 10 minutes, and finally allowed to cool to room temperature in vacuo. The resultant brittle mass of polymer, 0.95 g., was pulverized to a white powder, insoluble in refluxing ethanol, ethylacetate, dimethylformamide, and acetone (the starting bis-(azaboradioxacyclooctane) is readily soluble in these solvents, cold). The yield of polymer was quantitative. It decomposed without melting on a hot plate.

Example II 1.233 g. of the bis-(azaboradioxacyclooctane) of Example I (0.00270 mole) and 0.617 g. "Bisphenol A" (0.0027 mole), mixed dry and heated as in Example I, showed sintering at 100° C., melting and vapor evolution at 110–125° C., and formation of a clear, water-white liquid at 150° C. During application of vacuum at 150° (1–5 mm. of Hg) for one hour, a portion foamed over

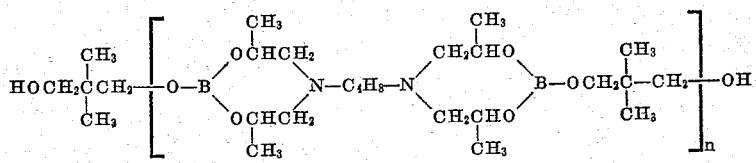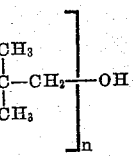

where $n=5$–$50$, having a molecular weight range of about 2246 to about 21,518. Such polymers form very useful copolymers, for example, by further condensation with polyepoxies, polyisocyanates, and acidic polyesters. The low molecular weight polymers are also useful in imparting special effects to cellulosic fibers, i.e. baking a cotton or rayon cloth impregnated with a polymer imparts added flame resistance and greater affinity for basic dyes. We have found the simplest preparation of low molecular weight polymers to be a condensation involving "nascent," rather than preformed alkylene-bis-(azaboradioxacyclooctanes). The in situ reaction of butyl alcohol, boric acid, a tetra-(hydroxyalkyl)diamine and neopentyl glycol, described in Example V, is one instance of this. A workable equivalent is the simultaneous reaction of n-butyl borate, dibutyleneglycol, and ethylene-bis-(iminodiethanol). Although these two reactions are carried out under roughly the same conditions of stirred distillation that give high molecular weight polymers from the preformed bis-(azaboradioxacyclooctane), both yield about the same relatively low molecular weight condensates.

After the reaction is complete, the polymer is recovered using conventional techniques, preferably by filtration or vacuum evaporation. The products are almost always white solids, decomposing at or above 200° C. The low molecular weight products tend to be somewhat soluble in solvents such as tetramethylene sulfone, but the higher molecular weight products are not soluble in most organic solvents.

Our invention is further illustrated by the following examples.

Example I

A mixture of 1.186 g. of 1,2-bis-(3,7-dimethyl-5-butoxy-5-bora - 4,6 - dioxa-1-azacyclooctyl)ethane and 0.161 g. ethylene glycol, 0.0026 mole each, was heated in a lightly stoppered, tared test-tube at 100° for ½ hour, while being stirred (by a copper wire) to a homogeneous and was lost. On being heated in vacuo at 200°, and thereafter cooled, it formed a colorless, brittle glass, soluble in ethanol, insoluble in ethyl acetate or benzene, and fractionable into an acetone-soluble glass and an acetone-insoluble higher molecular weight gum.

Example III

Under almost the same conditions, 1.337 g. (0.00293 m.) of 1,1-ethylene-bis-(5-methoxy-1-aza-5-bora-4,6-dioxacyclooctane) and 0.199 g. (0.00147 m.) pentaerythritol gave a clear, water-white glass, somewhat hygroscopic when powdered, melting at 90–100° C. It formed a weakly alkaline aqueous solution.

Example IV

A suspension of 1.5 g. of 1,2-ethylene-bis-(5-methoxy-1-aza-5-bora-4,6-dioxacyclooctane) in 5 ml. of diethylene glycol was heated to solution (about 75° C.). The evolution of methanol was evident by the odor. The solution was held at 130–150° C. for 30 minutes, during which time it became progressively more viscous. Since no marked precipitate formed when the solution was cooled, 50 ml. of ethyl ether were added with stirring, and stirring was continued at 15–20° for an additional 30 minutes. The mixture was allowed to settle, then decanted and the residue was held at about 70° in vacuo overnight. There was thus obtained as a tacky oil, approximately 1.5 g. of water-dispersible polymer.

Example V

A stirred mixture of 139 g. N,N,N′-tris-(2-hydroxypropyl)-N′-(2-hydroxyethyl)ethylenediamine (available commercially under the trade name "OH! OH!"), 156 g. 2,2-dimethyl-1,3-propanediol ("neopentyl" glycol), 3 g. toluenesulfonic acid monohydrate and 62 g. boric acid in 1000 ml. of a 1:2 by volume n-butanol-xylene mixture was refluxed for a period of two hours, then distilled through a short, bead-filled column at a reflux ratio of about 2:1. Polymer started to precipitate before all of the butanol had been distilled. When the liquid level in the distillation pot had been reduced to about 600 ml., the stirred mixture was brought to room temperature, and then filtered to give 163 g. of polymer, a white solid which melted indefinitely above 110° C.

*Example VI*

An intimate mixture of 3.5 g., 1,2-ethylene-bis-(5-ethoxy-1-aza-5-bora-4,6-dioxacyclooctane) and 3.3 g. bis-(2-hydroxy-3,5-dichlorophenyl)-methane was kept at 90° C. and about 5 mm. of Hg pressure for 24 hours; a weight loss of approximately 0.26 g. resulted. The solid white mass was triturated with ether and chloroform to give, as the polymeric residue, 1.6 g. of white solid containing boron, halogen and nitrogen. It was more readily hydrolyzed than any of other products.

*Example VII*

To solution of 1 g. 1,2-ethylene-bis-(5-methoxy-1-aza-5-bora-4,6-dioxacyclooctane) in 50 ml. water was added 5 g. of filter paper in fine pieces. The slurry was stirred (while being boiled) for 10 minutes, which converted most of the 5-methoxy groups to 5-hydroxy groups, and then evaporated dry in vacuo at room temperature. The fibrous mass, weight 5.9 g., was baked at 105° C. for 5 minutes to give a rather stiff mass containing boron and nitrogen not removable by washing with water. The cellulosic mass is appreciably slower burning than the control paper treated in the same way with water alone. It also is more quickly and deeply dyed by the simple azo dye from sulfanilic acid and phenol than is the control, and less of the dye is removed in rinsing.

It has thus been shown that our novel direct polymers with cellulose, e.g. paper, are more flame-resistant and more substantive to the inexpensive acid azo dyes for which cellulose has normally no affinity. Our novel polymer of Example VI, applied as a slurry to cloth, exhibits much the same results. Athough its flame-retarding effects are less than those of the direct polymer, it introduces one new advantage, i.e., antisepsis. The cellulose treated with the phenolic polymer shows marked resistance to mould and rot, presumably due to a very slow release of the bisphenol. The advantages obtained by using our novel polymers are not restricted to cellulose itself. Reaction of the bis-(azaboradioxacyclooctanes) with cellulose acetate gives a cellulosic polymer containing boron and nitrogen, which shows substantially the same enhanced properties possessed by the products containing cellulose alone.

The molecular weights of our novel polymers can range from no less than about 2,000 to above 1,000,000, depending on the severity of condensation conditions. It is desirable for most purposes to have products of limited molecular weight range and this can best be achieved by stopping condensation after the desired amount of volatile co-product has evolved.

As we have noted, the new polymers are excellent thickeners for paints and latices. The lower molecular weight products markedly improve the viscosity of latices for water-based paints when added thereto in small amounts, e.g. from 1–5% by weight, in the form of a dilute (5–15% by weight) solution or stable suspension of polymer in a water-miscible solvent such as dimethylformamide or tetramethylenesulfone. The higher molecular weight products serve to thicken oil-based paints when milled in a suitable oil for paint formulation, and added to the paint components in the amounts indicated above.

We claim:
1. The polymeric reaction product of a bis-(azaboradioxacyclooctane) of the formula:

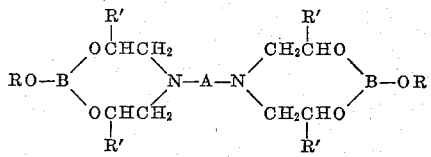

wherein R is a member selected from the group consisting of hydrogen, lower alkyl and furfuryl, R' is a member selected from the group consisting of hydrogen and lower alkyl, and A is a divalent normal lower alkylene chain having from 2–6 carbon atoms which is attached to each nitrogen through a different carbon atom; with a polyhydric alcohol selected from the group consisting of (a) saturated aliphatic polyols having from 2 to 6 carbon atoms and from 2 to 4 hydroxyl groups, each on separate carbon atoms, (b) hydroxy(polyalkoxy)alkanols of the formula $HO(C_nH_{2n}O)_mH$ in which $n$ is an integer having a value of 2 to 4 and $m$ is an integer having a value of 1 to 5, (c) bisphenols having from 12 to 23 carbon atoms, and (d) cellulose.

2. A polymer according to claim 1 wherein R and R' are lower alkyl and said polyhydric alcohol is a saturated aliphatic polyol having from 2 to 6 carbon atoms and from 2 to 4 hydroxyl groups, each on separate carbon atoms.

3. A polymer according to claim 1 wherein R and R' are lower alkyl and said polyhydric alcohol is a bisphenol having from 12 to 23 carbon atoms.

4. A polymer according to claim 1 wherein R is lower alkyl, R' is hydrogen and said polyhydric alcohol is a saturated aliphatic polyol having from 2 to 6 carbon atoms and from 2 to 4 hydroxyl groups, each on separate carbon atoms.

5. A polymer according to claim 1 wherein R is lower alkyl, R' is hydrogen and said polyhydric alcohol is a hydroxy(polyalkoxy)alkanol of the formula $$HO(C_nH_{2n}O)_mH$$

in which $n$ is an integer having a value of 2 to 4 and $m$ is an integer having a value of 1 to 5.

6. A polymer according to claim 1 wherein R is lower alkyl, R' is hydrogen and said polyhydric alcohol is cellulose.

7. The polymeric reaction product of 1,2-bis-(3,7-dimethyl-5-butoxy-5-bora-4,6-dioxa-1-azacyclooctyl)-ethane with ethylene glycol.

8. The polymeric reaction product of 1,2-bis-(3,7-dimethyl-5-butoxy-5-bora-4,6-dioxa-1-azacyclooctyl)ethane with 2,2-bis(4-hydroxyphenol)propane.

9. The polymeric reaction product of 1,1-ethylene-bis-(5-methoxy-1-aza-5-bora-4,6-dioxacyclooctane) with pentaerythritol.

10. The polymeric reaction product of 1,2-ethylene-bis-(5-methoxy-1-aza-5-bora-4,6-dioxacyclooctane) with diethylene glycol.

11. The polymeric reaction product of 1,2-ethylene-bis-(5-methoxy-1-aza-5-bora-4,6-dioxacyclooctane) with cellulose.

References Cited in the file of this patent
UNITED STATES PATENTS

| | | |
|---|---|---|
| 1,953,741 | Bennett | Apr. 3, 1934 |
| 1,975,890 | Williams | Oct. 9, 1934 |
| 2,352,796 | McLeod | July 4, 1944 |
| 2,630,419 | Wakefield et al. | Mar. 3, 1953 |
| 2,970,130 | Finestone | Jan. 31, 1961 |

UNITED STATES PATENT OFFICE
CERTIFICATE OF CORRECTION

Patent No. 3,042,636 July 3, 1962

Bernard Rudner et al.

It is hereby certified that error appears in the above numbered patent requiring correction and that the said Letters Patent should read as corrected below.

Column 3, line 13, strike out "molten".

Signed and sealed this 8th day of January 1963.

(SEAL)
Attest:

ERNEST W. SWIDER
Attesting Officer

DAVID L. LADD
Commissioner of Patents